United States Patent
Oh et al.

(10) Patent No.: US 10,988,640 B2
(45) Date of Patent: Apr. 27, 2021

(54) TWO-COMPONENT ADHESIVE COMPOSITION

(71) Applicant: LG Chem, Ltd., Seoul (KR)

(72) Inventors: Wan Kyu Oh, Daejeon (KR); Gyeong Shin Choi, Daejeon (KR); Seung Young Park, Daejeon (KR)

(73) Assignee: LG Chem, Ltd.

( * ) Notice: Subject to any disclaimer, the term of this patent is extended or adjusted under 35 U.S.C. 154(b) by 121 days.

(21) Appl. No.: 16/345,286

(22) PCT Filed: May 25, 2018

(86) PCT No.: PCT/KR2018/005987
§ 371 (c)(1),
(2) Date: Apr. 26, 2019

(87) PCT Pub. No.: WO2018/221898
PCT Pub. Date: Dec. 6, 2018

(65) Prior Publication Data
US 2019/0300754 A1    Oct. 3, 2019

(30) Foreign Application Priority Data

Jun. 2, 2017 (KR) .................. 10-2017-0069237
May 23, 2018 (KR) .................. 10-2018-0058409

(51) Int. Cl.
| | | |
|---|---|---|
| C09J 4/06 | (2006.01) | |
| C09J 11/04 | (2006.01) | |
| C09J 133/06 | (2006.01) | |
| C09J 163/00 | (2006.01) | |
| C09J 11/08 | (2006.01) | |

(52) U.S. Cl.
CPC .............. C09J 4/06 (2013.01); C09J 11/04 (2013.01); C09J 11/08 (2013.01); C09J 133/062 (2013.01); C09J 163/00 (2013.01)

(58) Field of Classification Search
CPC . C08K 3/041; C09J 4/06; C09J 163/00; C09J 133/00; C09D 4/06; C08F 283/00; C08F 283/10
See application file for complete search history.

(56) References Cited

U.S. PATENT DOCUMENTS

| | | |
|---|---|---|
| 4,223,115 A | 9/1980 | Zalucha et al. |
| 4,452,944 A | 6/1984 | Dawdy |
| 4,857,131 A | 8/1989 | Damico et al. |
| 5,399,601 A | 3/1995 | Kusumi et al. |
| 6,291,593 B1 | 9/2001 | Cheng |
| 6,433,091 B1 | 8/2002 | Cheng |
| 6,512,043 B2 | 1/2003 | Wang et al. |
| 6,939,932 B2 | 9/2005 | Kneafsey et al. |
| 7,479,528 B2 | 1/2009 | Wang et al. |
| 7,776,963 B2 | 8/2010 | Wang et al. |
| 7,956,143 B1 | 6/2011 | Xia et al. |
| 8,119,754 B2 | 2/2012 | Levandoski et al. |
| 8,202,932 B2 | 6/2012 | Kneafsey et al. |
| 8,362,120 B2 | 1/2013 | Huang et al. |
| 9,315,701 B2 | 4/2016 | Wang et al. |
| 9,416,299 B2 | 8/2016 | Kropp et al. |
| 9,657,203 B2 | 5/2017 | Murray et al. |
| 9,732,257 B2 | 8/2017 | Houlihan et al. |
| 9,896,607 B2 | 2/2018 | Hill et al. |
| 2004/0192831 A1 | 9/2004 | Chen et al. |
| 2004/0229990 A1 | 11/2004 | Righettini et al. |
| 2007/0093600 A1 | 4/2007 | De Cooman et al. |
| 2008/0202683 A1 | 8/2008 | Tsuno et al. |
| 2010/0116435 A1 | 5/2010 | Curet et al. |
| 2011/0083804 A1 | 4/2011 | Curet |
| 2011/0120646 A1 | 5/2011 | Gorodisher et al. |
| 2011/0189478 A1 | 8/2011 | Hirano et al. |
| 2012/0171362 A1 | 7/2012 | Kim et al. |
| 2013/0244041 A1 | 9/2013 | Cho et al. |
| 2015/0043069 A1 | 2/2015 | Lee et al. |
| 2015/0147556 A1 | 5/2015 | Sasaki et al. |
| 2015/0225626 A1 | 8/2015 | Murray et al. |
| 2015/0376473 A1 | 12/2015 | Khongal et al. |
| 2016/0333231 A1 | 11/2016 | Choi et al. |
| 2017/0029673 A1 | 2/2017 | Krishnan et al. |
| 2019/0153271 A1* | 5/2019 | Oh .............. C09J 4/06 |
| 2020/0002587 A1* | 1/2020 | Jialanella ......... C09J 7/10 |

FOREIGN PATENT DOCUMENTS

| | | |
|---|---|---|
| CN | 1162962 A | 10/1997 |
| CN | 1791651 A | 6/2006 |
| CN | 101497749 A | 8/2009 |
| CN | 102086372 A | 6/2011 |
| CN | 102159642 A | 8/2011 |
| CN | 102482547 A | 5/2012 |
| CN | 103108931 A | 5/2013 |
| CN | 103173159 A | 6/2013 |
| CN | 103834307 A | 6/2014 |
| CN | 104342042 A | 2/2015 |

(Continued)

OTHER PUBLICATIONS

Translation of KR 2015080511 (2015, 12 pages).*
Google patents translation of CN 108314980 (2018, 9 pages).*
Google patents translation of EP 0232226 (1987, 16 pages).*
Search report from International Application No. PCT/KR2018/005987, dated Sep. 28, 2018.

(Continued)

*Primary Examiner* — Brieann R Johnston
(74) *Attorney, Agent, or Firm* — Lerner, David, Littenberg, Krumholz & Mentlik, LLP

(57) ABSTRACT

A two-component adhesive composition includes: (i) a first part of a (meth)acrylate-based monomer mixture including components (a1) to (a3) below: (a1) an alkyl (meth)acrylate compound, and any one or more of a (meth)acrylate compound having an alkoxysilyl group, and a (meth)acrylate compound having an unsaturated functional group except for an acryloyl group, (a2) 50 to 100 parts by weight of an adhesive reinforcing agent relative to the 100 parts by weight of the (meth)acrylate-based monomer mixture, and (a3) 1 to 10 parts by weight of a filler relative to the 100 parts by weight of the (meth)acrylate-based monomer mixture; and (ii) a second part including components (b1) and (b2) below with a weight ratio of 1:1 to 20:1, where (b1) 100 parts by weight of an epoxy resin, and (b2) 50 to 150 parts by weight of an initiator with respect to (b1).

12 Claims, No Drawings

(56) References Cited

FOREIGN PATENT DOCUMENTS

| | | | |
|---|---|---|---|
| CN | 104673123 A | 6/2015 | |
| CN | 104781358 A | 7/2015 | |
| CN | 106147645 A | 11/2016 | |
| CN | 108314980 A * | 7/2018 | |
| EP | 0086469 B1 | 1/1985 | |
| EP | 0232226 A2 * | 8/1987 | ............ C08F 291/00 |
| EP | 0270318 B1 | 4/1992 | |
| EP | 0278642 B1 | 8/1993 | |
| EP | 0357304 B1 | 3/1994 | |
| EP | 1187888 B1 | 11/2004 | |
| EP | 1086185 B1 | 5/2007 | |
| JP | S62185772 | 8/1987 | |
| JP | H05105862 A | 4/1993 | |
| JP | 3385095 B2 | 3/2003 | |
| JP | 2003138234 A | 5/2003 | |
| JP | 5541939 B2 | 7/2014 | |
| KR | 100592911 B1 | 6/2006 | |
| KR | 20080088487 A | 10/2008 | |
| KR | 20110043685 A | 4/2011 | |
| KR | 20120087494 A | 8/2012 | |
| KR | 101244438 B1 | 3/2013 | |
| KR | 20150080511 A | 7/2015 | |
| KR | 20160134241 A | 11/2016 | |
| WO | 9615157 A1 | 5/1996 | |

OTHER PUBLICATIONS

Chinese Search Report for Application No. CN201880004169.0 dated Dec. 28, 2020.
Huiming et al., Synthesis of TDE—85 Epoxy Resin Acrylate and its UV cured property, Research Institute of Materials Science, Dec. 31, 1997, (Abstract Only).

\* cited by examiner

TWO-COMPONENT ADHESIVE COMPOSITION

CROSS-REFERENCE TO RELATED APPLICATION

The present application is a national phase entry under 35 U.S.C. § 371 of International Application No. PCT/KR2018/005987, filed on May 25, 2018, which claims priority of Korean Patent Application No. 10-2017-0069237 filed on Jun. 2, 2017, and Korean Patent Application No. 10-2018-0058409 filed on May 23, 2018, the entire contents of which are incorporated herein by reference.

BACKGROUND OF THE INVENTION

(a) Field of the Invention

The present invention relates to a two-component adhesive composition with excellent lap shear strength and adherence.

(b) Description of the Related Art

A two-component acrylic adhesive is advantageous in that it can be hardened at room temperature, adhered with a large area, rapidly hardened, and have adherence with respect to various plastics, and thus, has been used in fields such as for vehicles, construction, marine vessels, and wind power.

However, the two-component acrylic adhesive is disadvantageous in terms of lower adherence than one-component epoxy adhesives and a lower elongation percentage than urethane adhesives.

Accordingly, there is a limit in applying the two-component acrylic adhesive to fields that require strong adherence such as adhesives for a vehicular structure, and a high elongation percentage such as adherence of an outer part of a vehicle.

In addition, there is a trade-off relationship between flexibility/toughness and strength in various adhesive compositions.

To increase flexibility and toughness in a general adhesive composition, a gummy polymer is added, but addition of the gummy polymer adversely affects modulus and final strength of the adhesive.

Accordingly, there is a need to develop an adhesive composition having excellent adherence without sacrificing strength.

SUMMARY OF THE INVENTION

The present invention has been made in an effort to provide a two-component adhesive composition having advantages of excellent lap shear strength and adherence.

According to an embodiment of the present invention, a two-component adhesive composition includes:
(i) a first part including components (a1) to (a3) below; and (ii) a second part including components (b1) and (b2) below with a weight ratio of 1:1 to 20:1:
(i) 100 parts by weight of a (meth)acrylate-based monomer mixture including
 (a1) (a11) an alkyl (meth)acrylate compound, and
 (a12) any one or more of (a121) a (meth)acrylate compound having an alkoxysilyl group and (a122) a (meth)acrylate compound having an unsaturated functional group except for an acryloyl group,
 (a2) 50 to 100 parts by weight of an adhesive reinforcing agent, and
 (a3) 1 to 10 parts by weight of a filler; and
(ii)
 (b1) 100 parts by weight of an epoxy resin, and
 (b2) 50 to 150 parts by weight of an initiator with respect to (b1).

A two-component acrylic adhesive according to the present invention may include a (meth)acrylate-based compound of a specific composition to achieve a high adherence due to excellent lap shear strength and to achieve an excellent adhesive characteristic with respect to a metal and a plastic material, and thus, may be used as an adhesive in various fields such as for vehicles, construction, marine vessels, and wind power.

BRIEF DESCRIPTION OF THE DRAWINGS

Detailed Description of the Embodiments

The terminology used herein is only for the purpose of describing particular embodiments and is not intended to be limiting of the present invention.

As used herein, singular forms as well, unless the context clearly indicates otherwise.

It will be further understood that the terms "comprises", "includes", or "have" when used in this specification specify the presence of stated features, integers, steps, operations, elements, components, or groups thereof, but do not preclude the presence or addition of one or more other features, integers, steps, operations, elements, components, or groups thereof.

It will be understood that when a layer or an element is referred to as being "on" or "above" layers or elements, it may be directly on the other layers or elements or other layers or elements may be additionally formed between layers, on an object or a member.

As the invention allows for various changes and numerous embodiments, particular embodiments will be illustrated in the drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention.

In the specification, (meth)acrylate is a concept including both acrylate and methacrylate.

Hereinafter, a two-component acrylic adhesive according to an embodiment of the present invention will be described.

A two-component adhesive composition according to an embodiment of the present invention may include:
(i) a first part including a (meth)acrylate-based monomer mixture including components (a1) to (a3) below; and
 (a1) an alkyl (meth)acrylate compound, and
  any one or more of
   a (meth)acrylate compound having an alkoxysilyl group, and
   a (meth)acrylate compound having an unsaturated functional group except for an acryloyl group,
 (a2) 50 to 100 parts by weight of an adhesive reinforcing agent relative to the 100 parts by weight of the (meth)acrylate-based monomer mixture, and
 (a3) 1 to 10 parts by weight of a filler relative to the 100 parts by weight of the (meth)acrylate-based monomer mixture; and (ii) a second part including components (b1) and (b2) below:
  (b1) 100 parts by weight of an epoxy resin, and
  (b2) 50 to 150 parts by weight of an initiator with respect to (b1).

The adhesive composition may include a (meth)acrylate-based compound having a functional group with a specific structure as well as a generally used (meth)acrylate-based compound, and thus, may provide a two-component adhesive composition having improved lap shear strength and achieving high adherence in a resulting material thereof during adhesion.

An adhesive composition according to an embodiment of the present invention may further enhance effects of the invention via control of a type and physical properties of each component.

Hereinafter, constituent components are each described in detail.

First Part

With regard to an adhesive composition according to an embodiment of the present invention, the first part may be a main part and may include the following components:
100 parts by weight of a (meth)acrylate-based monomer mixture including
  (a1) an alkyl (meth)acrylate compound, and
  any one or more of
    a (meth)acrylate compound having an alkoxysilyl group, and a (meth)acrylate compound having an unsaturated functional
    group except for an acryloyl group;
  (a2) 50 to 100 parts by weight of an adhesive reinforcing agent; and
  (a3) 1 to 10 parts by weight of a filler.

(a1) Component

According to the present invention, an alkyl (meth)acrylate may include both an alkylacrylate-based monomer and an alkylmethacrylate-based monomer.

In the alkyl (meth)acrylate, the alkyl group may be a $C_1$ to $C_{20}$ linear or branched alkyl group.

When the carbon number of an alkyl group is greater than 20, a glass transition temperature (Tg) of the adhesive composition may be increased or it may be difficult to control adherence.

Examples of the alkyl (meth)acrylate may include methyl methacrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate, and thereamong, mixtures of two or more thereof may be used.

In the alkyl (meth)acrylate, in consideration of an effect of improving adherence via control of the carbon number of an alkyl group in the alkyl (meth)acrylate, in detail, the alkyl group may be a $C_1$ to $C_4$ linear or branched alkyl group, and in more detail, may be a methyl group or an ethyl group.

The alkyl (meth)acrylate may be included at about 40 to about 70 wt % based on a total weight of a (meth)acrylate-based monomer mixture, and within this range, a wetting characteristic as well as excellent adherence may be enhanced.

When the content of the alkyl (meth)acrylate is low, there is a worry about deterioration of the wetting characteristic between adhesives and an adherent material, and when the content is excessively high, there is a worry about deterioration of the adhesive characteristic.

In consideration of excellence of the improved effect via control of content of alkyl (meth)acrylate in the adhesive composition, the alkyl (meth)acrylate may be included at about 50 to about 60 wt %.

According to the present invention, a (meth)acrylate compound having an alkoxysilyl group may include any monomer having a substituted alkoxysilyl group with an alkyl group of the aforementioned alkyl (meth)acrylate.

In this case, an alkoxy group connected with a silicon atom may be an alkoxy group having a $C_1$ to $C_5$ linear or branched alkyl structure, and the alkoxy group may be a monoalkoxysilyl group, a dialkoxysilyl group, and a trialkoxysilyl group, one to three of which are connected with a silicon atom.

The alkoxysilyl groups may be connected to a (meth)acryloyl group through a $C_1$ to $C_5$ alkylene link group.

An example thereof may include mono, di, and tri methoxysilylmethyl (meth)acrylate, methylmethacrylate, mono, di, and tri methoxysilylethyl (meth)acrylate, and mono, di, and tri methoxysilylpropyl (meth)acrylate, and thereamong, a mixture of two or more thereof may be used.

In the alkyl (meth)acrylate, in consideration of an effect of improving adherence via control of the carbon number of an alkyl group in a (meth)acrylate having an alkoxysilyl group, in detail, the alkyl group may be a $C_1$ to $C_4$ linear or branched alkyl group, and in more detail, may be an ethyl group or a propyl group.

The (meth)acrylate having the alkoxysilyl group may be included at about 1 to about 10 wt % based on a total weight of a (meth)acrylate-based monomer mixture, and within the range, excellent adhesive characteristics may be achieved with respect to various adherent target materials such as metal, synthesis plastic, and glass.

Particularly, an alkoxysilyl group may react with a silica-based filler such as silica and hollow silica of the present adhesive to chemically react with each other, and accordingly, secondary cross-linking bonding may be formed between the silica-based filler and the monomer, and thus an excellent adhesive characteristic may be achieved.

According to the present invention, a (meth)acrylate compound having an unsaturated functional group except for an acryloyl group may include any monomer with a substituted ethylenic unsaturated functional group, instead of an acryloyl group, with an alkyl group of the aforementioned alkyl (meth)acrylate.

In detail, the ethylenic unsaturated functional group may be connected in the form of a vinyl or allyl group, and in this case, the vinyl group may be connected by a $C_1$ to $C_5$ alkylene link group.

Examples of the compound may include allyl (meth)acrylate, vinyl (meth)acrylate, propenyl (meth)acrylate, and butenyl (meth)acrylate, and thereamong, a mixture of two or more thereof may be used, and it may be desirable to use vinyl (meth)acrylate and allyl (meth)acrylate in consideration of an effect of improving adherence via control of the carbon number of alkylene.

The (meth)acrylate compound having an unsaturated functional group except for an acryloyl group may be included at about 1 to about 10 wt % based on a total weight of a (meth)acrylate-based monomer mixture, and within this range, secondary cross-linking bonding with a more complex form as well as cross-linking bonding between acryloyl groups may be formed, such that an excellent adhesive characteristic may be achieved.

The (meth)acrylate-based monomer mixture may further include a urethane acrylate oligomer.

The urethane acrylate oligomer may improve the wetting characteristic between adhesives and an adherent material, may increase generation of hydrogen bonds with a filler or alkyl (meth)acrylate, and may increase a degree of dispersion of an adhesive reinforcing agent to improve the adhesive characteristic of an adhesive composition.

An adhesive surface may be hardened, and then the flexibility of the adhesive surface may be increased such that breakage, etc. may not occur despite an external impact, thereby enhancing adhesive stability.

The urethane acrylate oligomer may be an aliphatic urethane (meth)acrylate oligomer or an aromatic urethane (meth)acrylate oligomer, and it may be desirable to use a urethane with a molecular weight of from about 200 to about 40,000 g/mol and an equivalent of acrylate may be from about 1 to about 20 per oligomer.

In detail, the aliphatic urethane acrylate may be an oligomer having 2 to 10 acrylate functional groups with a molecular weight of about 1000 to about 20,000.

Examples of the urethane acrylate oligomer may include Miramer PU2030i, PU2050, PU2300C, PU3000, PU3450, MU9500, and SC2152, which are available from Miwon Specialty Chemical Co. Ltd., Ebecryl 230, 244, 284, 4883, 8254, 8411, 8413, and 8807, which are available from Allnex, and Sartomer CN929, CN964, CN965, CN980, CN981, CN986, CN996, CN9005, CN9013, and CN9026, which are available from Arkema, and thereamong, a mixture of two or more thereof may be used.

The urethane acrylate oligomer may be included in an amount from about 10 to 40 wt %, and in detail, at about 15 to about 30 wt %, based on a total weight of a (meth) acrylate-based monomer mixture.

When the content is excessively low, the wetting characteristic between adhesives and an adherent material may deteriorate and there is a problem in that impact strength deteriorates on an adhesive surface after hardening, and when the content is excessively high, a degree of dispersion of an adhesive reinforcing agent may deteriorate and there is a problem in terms of very low hardness of the adhesive surface.

In terms of adhesion strength, a phosphoric acid ester, etc. of bisphenol A polyethylene glycol dietherdimethacrylate or PPG methacrylate may be used, and for the durability and flexibility of an adhesive surface, a urethane acrylate oligomer, etc. may be used.

(a2) Component—Adhesive Reinforcing Agent

The adhesive reinforcing agent may improve mechanical properties in an adhesive composition, and may include rubber, a rubber copolymer, a rubber derivative, or the like.

Examples thereof may include: a butadiene-based rubber such as vinyl terminated butadiene rubber, chlorinated butadiene rubber, chlorosulfonated butadiene rubber, nitrile butadiene rubber (NBR), and styrene butadiene rubber (SBR); a silicon rubber; a rubber copolymer such as a styrene-butadiene-polymethylmethacrylate triblock copolymer, poly(acrylonitrile-butadiene-styrene), and poly(styrene-butadiene styrene); or a rubber derivative, and thereamong, a mixture of two or more thereof may be used.

The adhesive reinforcing agent may include core-shell rubber or non-core shell rubber.

The core-shell rubber may be a "core shell" type of graft copolymer or a "free-shell" cross-linking gum particulate, and for example, acrylonitrile-butadiene-styrene (ABS), methacrylate-butadiene-styrene (MBS), and methacrylate-acrylonitrile-butadiene-styrene (MABS).

The vinyl terminated butadiene rubber may be liquid at room temperature, and may have a glass transition temperature of less than 0 □.

A vinyl terminated compound may be a (meth)acrylate-terminated type, e.g., a (meth)acrylate-terminated polybutadiene-acrylonitrile copolymer (e.g., HYCAR VTBN) or (meth)acrylate-terminated polybutadiene (e.g., HYCAR VTB (Emerald Performance Polymers)).

The adhesive reinforcing agent may include about 20 wt % or less, or about 5 to about 15 wt %, of a vinyl terminated butadiene rubber based on a total weight of an adhesive reinforcing agent.

The aforementioned adhesive reinforcing agent may be included at 50 to 100 parts by weight, and in detail, about 50 to about 70 parts by weight, based on 100 parts by weight of a (meth)acrylate-based monomer mixture.

When the content of the adhesive reinforcing agent is very low, there is a worry about deterioration of the mechanical characteristic of an adhesive composition, and when the content is very high, there is a worry about deterioration of the close contacting property with a material.

(a3) Component—Filler

The filler may improve the mechanical characteristic of an adhesive composition as well as an adhesive reinforcing agent.

The filler may be silica, fumed silica, nanoclay, or the like, and thereamong, a mixture of two or more thereof may be used.

Thereamong, in consideration of an effect of modifying the fluidity of an adhesive composition and reinforcing elementary particles, the filler may include a silica-based filler such as silica and fumed silica, and when the filler has an effect of controlling recess of an applied adhesive bead, the filter may include fumed silica.

The filler may be included at 1 to 10 parts by weight, and in detail, at about 2 to about 8 parts by weight, based on 100 parts by weight of a (meth)acrylate-based monomer mixture.

When the content of the filler is very low, there is a worry about reduction in an effect of improving the mechanical characteristic, and when the content is very high, there is a worry about deterioration of adherence and close contacting properties with a material.

Second Part

In the adhesive composition according to an embodiment of the present invention, (ii) the second part may include (b1) 100 parts by weight of an epoxy resin, and (b2) 50 to 150 parts by weight of an initiator including saccharin and a toluidine-based compound with respect to (b1).

(b1) Component—Epoxy Resin

The epoxy resin may affect a dielectric constant and dielectric loss coefficient of an adhesive component and an adhesive film prepared therefrom, and may enhance heat resistance and mechanical properties.

Accordingly, a type of the epoxy resin is not particularly limited, but when the epoxy resin has an epoxy equivalent of 200 g/eq to 500 g/eq, a dielectric constant and dielectric loss coefficient may be lowered while increasing heat resistance of an adhesive composition.

An example of the epoxy resin may include cycloaliphatic epoxide, epoxy novolac resin, bisphenol-A epoxy resin, bisphenol-F epoxy resin, bisphenol-A epichlorohydrin-based epoxy resin, alkyl epoxide, a dicyclopentadiene phenol addition reaction type of epoxy resin, limonene dioxide, or polyepoxide, and thereamong, a mixture of two or more thereof may be used.

When being mixed with a first liquid, the epoxy resin may be used at about 1 to about 10 parts by weight, and in detail, at about 2 to about 8 parts by weight, based on 100 parts by weight of the (meth)acrylate monomer included in the first liquid.

When the content of the epoxy resin is very low, an effect of enhancing heat resistance and mechanical properties may deteriorate, and when the content is very high, the fluidity of the composition may be excessively increased.

(b2) Component—Initiator

The initiator may initiate a polymerization reaction by providing a free radical, and may be expected to improve a curing rate and adherence along with a combination of a type of the initiator and hardening accelerator.

An example of other initiators may include hydrogen peroxide, alkyl peroxide, alkyl hydroperoxide, arylalkyl peroxide, or peroxy ester, and thereamong, a mixture of two or more thereof may be used.

In more detail, the initiator may include diisopropylbenzene hydro peroxide, t-hexyl hydro peroxide, 1,1,3,3-tetramethylbutyl hydro peroxide, dicumyl peroxide, t-butyl cumyl peroxide, methyl ethyl ketone peroxide, methyl isobutyl ketone peroxide, cyclohexanone peroxide, cumene hydroperoxide, t-butyl hydroperoxide, benzoyl peroxide, acetyl peroxide, lauroyl peroxide, 1,1-di(t-butyl peroxy)cyclohexane, 1,1-di(t-butyl peroxy)3,3,5-trimethylcyclohexane, hydrogen peroxide, t-butyl peroxybenzoate, t-butyl peroxy 2-ethyl hexanoate, bis(4-t-butylcyclohexyl)peroxydicarbonate, or a mixture thereof, and thereamong, may include benzoyl peroxide.

When being mixed with a first liquid, the initiator may be used at about 0.1 to about 10 parts by weight, and in detail, at about 1 to about 5 parts by weight based on 100 parts by weight of the (meth)acrylate monomer included in the first liquid.

Optional Component for Second Part—Carbon Nanotubes

According to an exemplary embodiment of the present invention, the second part may further include carbon nanotubes with an aspect ratio of from $1 \times 10^2$ to $1 \times 10^5$.

The carbon nanotubes may have a carbon structure configured in the form of a tube by coupling hexagonal honeycomb patterns with six carbons connected with each other, may have a very high aspect ratio, and has been mainly used as a filler of a polymer composite material due to excellent mechanical characteristic, heat resistance, chemical resistance, etc.

In the adhesive composition according to an embodiment of the present invention, the carbon nanotubes may have an effect of a nanocomposite material as well as a polymer resin used as the adhesive reinforcing agent, and as a result, may improve the mechanical properties, chemical resistance, adherence, and heat resistance of the adhesive composition.

In detail, the carbon nanotubes may be single-walled carbon nanotubes, double-walled carbon nanotubes, or multi-walled carbon nanotubes, and may be a bundle type of carbon nanotubes with a bundle or a rope in which a plurality of carbon nanotubes are arranged in parallel or are entangled using the carbon nanotubes as a monomer, or a non-bundled or entangled type of carbon nanotubes without a predetermined shape such as a bundle or a rope.

Thereamong, a mixture of two or more thereof may be used.

Thereamong, in consideration of an effect of improving adherence and heat resistance of the adhesive composition, the carbon nanotubes may be multi-walled carbon nanotubes, and in consideration of the excellent dispersion in the adhesive composition, the carbon nanotubes may be a bundle type of carbon nanotubes.

The carbon nanotubes may have a diameter of from about 1 to about 50 nm and a large aspect ratio with a length of several tens of μm, and in detail, in consideration of an excellent effect of improving dispersion of the carbon nanotubes and forming a nanocomposite material with the adhesive reinforcing agent, the carbon nanotubes may have an aspect ratio (ratio of length/diameter) of about $1 \times 10^2$ to about $1 \times 10^5$, and in more detail, about $5 \times 10^2$ to about $5 \times 10^4$.

The carbon nanotubes may have a BET specific surface area of from about 150 $m^2$/g or greater or from about 200 $m^2$/g to about 500 $m^2$/g, and in more detail, from about 220 to about 300 $m^2$/g, and may have a strand diameter of from about 2 nm to about 30 nm or from about 5 nm to about 20 nm, and in more detail, from about 5 nm to about 15 nm.

Due to the small diameter as well as the high specific surface area, mixing properties with a polymer material and dispersion in the adhesive composition may be excellent.

To ensure the excellent characteristic of the composite material of the carbon nanotubes, the most important factor may be uniform dispersion thereof.

When adhesives including carbon nanotubes achieve excellent dispersion, an effect of remarkably improving mechanical properties such as strength and elasticity may be achieved.

A degree of dispersion may be improved via a covalent bond of chemical species in a sidewall, and an end or defective locations of carbon nanotubes, and the chemical species may be inserted between bundles of the carbon nanotubes to easily disperse them in an adhesive composition.

In addition, dispersion of the carbon nanotubes may be increased in the adhesive composition via surface modification with non-covalent bonds.

Accordingly, it may be important to find modification of an optimum condition to improve adherence, and as such, structural properties between carbon nanotubes and adhesives may be improved.

In general, carbon nanotube aggregation may occur due to a large surface area, and high polarization of a pi electron cloud of the carbon nanotubes may generate a strong Van der Waals force between carbon nanotubes to inhibit uniform dispersion.

To prevent this, the carbon nanotubes may be used in the form of a dispersion solution obtained via dispersion in a dispersion medium.

In this case, the dispersion medium may include n-vinylpyrrolidone, butylacrylate, acrylic acid, benzoate ester-based oil, methylmethacrylate, or the like, and thereamong, in consideration of excellent compatibility with carbon nanotubes and storage stability, one or a mixture of the benzoate ester-based oil and the methylmethacrylate may be used.

The aforementioned dispersion medium for dispersion of the carbon nanotubes may be a constituent component of an adhesive composition, and thus may be used with a method of mixing the carbon nanotubes with the aforementioned compound and then dispersing the mixture and adding and mixing the remaining components during manufacture of the adhesive component.

The carbon nanotubes may be included at about 0.01 to about 1 wt % based on a total weight of an adhesive composition.

When content of the carbon nanotubes is very low, an effect of improving adherence along with use of the carbon nanotubes is slight, and when the content is very high, there is a worry about deterioration of a degree of dispersion and deterioration of the close contacting property with a material.

Other Additives

An adhesive composition according to an embodiment of the present invention may further include one or more of generally known additives, and in detail, additives such as an adhesion promoter, an inhibitor, an accelerator, an antioxidant, a lubricant, an initiator, an oil, a curing agent, and a hardening accelerator may be added to at least one of the (i) first part and (ii) second part in addition to the aforementioned various components, within the range in which an effect of the present invention is not adversely affected.

The adhesion promoter may be a material for forming cross-linking for reinforcing a metallic interaction with a metal surface and a polymer network, and in detail, may be a phosphorus-containing compound such as a phosphinic acid mono-ester having a vinyl- or allyl-based unsaturated group of 1 unit, and a mono- or diester of phosphonic acid or phosphoric acid.

Detailed examples thereof may include: phosphoric acid; (meth)acrylate phosphates such as 2-methacryloiloxyethyl phosphate, bis-(2-methacryloiloxyethyl)phosphate, 2-acryloyloxyethyl phosphate, bis-(2-acryloyloxyethyl)phosphate, methyl-(2-methacryloiloxyethyl)phosphate, ethyl methacryloyloxyethyl phosphate, methyl acryloyloxyethyl phosphate, ethyl acryloyloxyethyl phosphate, propyl acryloyloxyethyl phosphate, isobutyl acryloyloxyethyl phosphate, ethylhexyl acryloylethyl phosphate, halopropyl acryloyloxyethyl phosphate, haloisobutyl acryloyloxyethyl phosphate, and haloethylhexyl acryloyloxyethyl phosphate; vinyl phosphonic acid; cyclohexene-3-phosphonic acid; α-hydroxybutene-2-phosphonic acid; 1-hydroxy-1-phenylmethane-1,1-diphosphonic acid; 1-hydroxy-1-methyl-1-diphosphonic acid; 1-amino-1-phenyl-1,1-diphosphonic acid; 3-amino-3-hydroxypropane-1,1-diphosphonic acid; aminotris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloiloxyethyl phosphinic acid; diallylphosphinic acid; and β-methacryloiloxyethylphosphinic acid or allyl methacryloiloxyethyl phosphinic acid, and thereamong, a mixture of two or more thereof may be used.

The adhesion promoter may be a (meth)acrylic acid, a metal (meth)acrylate (e.g., adimethacrylic acid zinc), or the like.

The adhesion promoter may be included in the first part of the adhesive composition at about 0.5 to about 10 wt %, and in more detail, about 1 to about 5 wt %, based on a total weight of a polymer.

The inhibitor may stabilize an adhesive composition and may suppress early free radical polymerization of the alkyl (meth)acrylate to provide an appropriate start time.

Detailed examples thereof may include naphtoquinone, anthroquinone, methyl hydroquinone, benzoquinone, methylether hydroquinone, or the like, and thereamong, a mixture of two or more thereof may be used.

The inhibitor may be included in the first part of the adhesive composition at about 0.01 to 1 wt %, and in more detail, 0.01 to 0.5 wt %, based on a total weight of the adhesive composition.

The accelerator may act as a catalyst for accelerating or enhancing hardening of the adhesive composition, and may include, in detail, an amine-based compound.

The amine-based compound may be a secondary amine (HN(Ra)2 where each Ra is independently a $C_4$ to $C_{10}$ alkyl), a tertiary amine (N(Rb)3 where each Rb is independently selected from a $C_1$ to $C_{20}$ alkyl, a $C_6$ to $C_{20}$ aryl, a $C_7$ to $C_{20}$ alkyl aryl, and a $C_7$ to $C_{20}$ aryl alkyl), an aromatic amine, or a heterocycle amine, and in more detail, may be 1,8-diazabicyclo(5.4.0)undecene-7-en (DBU), 1,4-diazabicyclo (2.2.2)octane (DABCO), triethylamine, a guanidine-based compound (e.g., tetramethylguanidine (TMG)), a toluidine-based compound (e.g., dimethyl-p-toluidine (DMPT), diethyl-p-toluidine (DEPT), dihydroxy ethyl p-toluidine, dimethyl-p-toluidine (DMPT), or dimethyl-o-toluidine (DMOT)), an aniline-based compound (e.g., dimethyl aniline and dihydroxyethyl aniline), a thiourea-based compound (e.g., acyl thiourea, benzoyl-thiourea, or aryl-thiourea), and a pyridine-based compound (e.g., dihydrophenyl pyridine), and thereamong, a mixture of two or more thereof may be used.

The accelerator may be included in the first part of the adhesive composition at about 0.1 to 5 wt %, and in more detail, about 1 to about 3 wt %, based on a total weight of the adhesive composition.

The antioxidant may achieve an oxidation prevention effect such as improvement in thermal stability of the adhesive composition, and may be a phosphorus-based, phenol-based, amine-based, or sulfur-based antioxidant, or the like.

For example, the phosphorus-based antioxidant may include: a phosphate such as triphenylphosphate (TPP) and triethyl phosphate (TEP); a phosphonate such as diethyl(3, 5-di-tert-butyl-4-hydroxybenzyl)phosphonate, bis(2,6-di-tert-butyl-4-methylphenyl)pentaerythritol diphosphate, bis (2,4-di-tert-butylphenyl)pentaerythritol diphosphate, bis(2, 4-dicumylphenyl)pentaerythritol-diphosphite, and distearyl pentaerythritol diphosphate; phosphinate; phosphine oxide; phosphazene; or metallic salts thereof, and thereamong, a mixture of two or more thereof may be used.

The phenol-based antioxidant may be a hindered phenol-based compound such as 2,6-di-tert-butyl-p-cresol, tetrakis [methylene-3-(3,5-di-tert-butyl-4-hydroxyphenyl)propionate]methane, thiodiethylene bis[3-(3,5-di-tert-butyl-4-hydroxyphenyl)propionate], and N,N'-hexane-1,6-diylbis[3-(3,5-di-tert-butyl-4-hydroxyphenylpropionamide], and thereamong, a mixture of two or more thereof may be used.

The antioxidant may be included in the first part from the adhesive composition in an amount of from about 0.1 to about 1 wt %, and in more detail, about 0.1 to about 0.5 wt %, based on a total weight of the adhesive composition.

The lubricant may increase formability to provide easy release in the case of desorption with a material, and in detail, may be a wax such as an olefin-based wax, a montan-based wax, and a montanic acid ester wax.

The lubricant may be included in the first part of the adhesive composition, and when the lubricant is included at an excessively high content, there is a worry about deterioration of formability, and thus the lubricant may be included in an amount from about 0.1 to about 1 wt %, and in more detail, from about 0.1 to about 0.5 wt %, based on a total weight of the adhesive composition.

In addition, the adhesive composition may further include an additive such as an oil (e.g., a benzoate ester-based oil such as alkyl benzoate); and a curing agent (e.g., ethylene diamine trianhydride); and a hardening accelerator (e.g., organic metallic salts or organic metal complex including one or more metal selected from the group consisting of iron, copper, zinc, cobalt, lead, nickel, manganese, and tin, such as copper (Cu) naphthenate and cobalt naphthenate).

The first and second parts with the aforementioned components may have appropriate viscosity by adjusting a type and content of the components.

In detail, in the adhesive composition according to the present invention, the second part may have higher viscosity than the first part, and in more detail, the first part may have viscosity of from about 5000 to about 60,000 cP and the second part may have higher viscosity than the first part in a range of from about 50,000 to about 150,000 cP.

The adhesive composition according to the present invention may be used by preparing the first and second parts via mixture of the aforementioned components, and then mixing the first and second parts to start reactive hardening.

In this case, the first and second parts may be mixed with a weight ratio of about 1:1 to about 20:1, in detail, a weight ratio of about 5:1 to about 15:1, and in more detail, a weight ratio of about 7:1 to about 12:1.

When the ratio of the second part is excessively low, the adhesive may be insufficiently hardened and there is a problem in terms of adherence and deterioration of heat resistance and durability of an adhesive surface, and when the ratio of the second part is excessively high, there is a problem in terms of compatibility between the mixed materials and dissolution.

The aforementioned adhesive composition having the composition may include an initiator of a specific component and may enable stable polymerization start reaction, and accordingly, may achieve excellent adherence, and may be used as an adhesive, a primer, a coating agent, or the like for adherence of various materials including metals such as zinc, copper, cadmium, iron, tin, aluminum, silver, chromium, and alloys thereof, and galvanealed steel including melted electric galvanealed steel and alloyed galvanealed steel, a polymer, reinforced plastic, fiber, glass, ceramic, and a wooden material, and may be used for a heterojunction such as with a metal or plastic.

The adhesive composition may have excellent lap shear strength, may enable adherence at room temperature, and may be particularly used in a field that requires strong adherence on a wide area of a large vehicle and a high elongation percentage, and in detail, in adherence of the ceiling and side panels of a bus, adherence of a truck trailer, a ceiling, a floor, a window, or a headlight cover of a train, or the like.

Hereinafter, an operation and effect of the present invention will be described in detail with reference to the following examples.

However, these examples are not intended to limit the purpose and scope of the one or more embodiments of the present invention.

EXAMPLES

Examples

A two-component acrylate adhesive was prepared using compositions represented according to Tables 1 and 2 below.

The following reagents may be used.

(Urethane acrylate oligomer: Miramer MU9500 available from Miwon Specialty Chemical Co. Ltd.;

Carbon nanotubes with an aspect ratio of $1 \times 10^4$, a diameter of 5 to 20 nm, and a BET specific surface area of 220 to 300 m$^2$/g;

Vinyl terminated butadiene rubber: VTBN 1300X43 available from Emerald;

Chlorosulphonated polyethylene: CSM3570 available from Santi Chemical;

Poly(styrene-butadiene-styrene): LG411 available from LG Chem.;

Poly(acrylonitrile-butadiene-styrene): HT700 available from LG Chem.;

Fumed Silica: M5 available from Cabot;

Nano titania: TiO2 nanoparticles available from US-Nano;

Wax: IGI 1250A available from IGI)

Evaluation of Adherence

Lap shear strength was measured via the ASTM D 3163 method using a two-component adhesive of the examples, and is summarized in tables below.

An adherent target material was a general cold rolled steel (CRS) material available from Dongbu Steel Co., Ltd.

TABLE 1

| Liquid type | Division | Material (unit: g) | Inventive Example 1 | Inventive Example 2 | Inventive Example 3 | Inventive Example 4 |
|---|---|---|---|---|---|---|
| First liquid | (Meth)acrylate-based monomer mixture | Methyl methacrylate | 50 | 50 | 50 | 50 |
| | | Urethane oligomer acrylate | 18 | 18 | 18 | 18 |
| | | 3-(trimethoxysilyl)propyl methacrylate | 2 | 2 | | |
| | | Allyl methacrylate | | | 2 | |
| | | Vinyl methacrylate | | | | 2 |
| | Adhesive reinforcing agent | Vinyl terminated butadiene rubber | 4.3 | 4.3 | 4.3 | 4.3 |
| | | Chlorosulphonated polyethylene | 3 | 3 | 3 | 3 |
| | | Poly(styrene-butadiene-styrene) | 2 | 2 | 2 | 2 |
| | | Poly(acrylonitrile-butadiene-styrene) | 15.5 | 15.5 | 15.5 | 15.5 |
| | Adhesion promoter | Methacrylated phosphate | 2 | 2 | 2 | 2 |
| | Inhibitor | Methylether hydroquinone (inhibitor) | 0.02 | 0.02 | 0.02 | 0.02 |
| | Antioxidant | 2,6-di-tert-butyl-p-cresol (antioxidant) | 0.12 | 0.12 | 0.12 | 0.12 |
| | Filler | Fumed silica | 3 | 2 | 2 | 2 |
| | Filler | Nano-titania | | 1 | | |
| | | Carbon nanotubes | 0.05 | 0.05 | 0.05 | 0.05 |
| | Additive | Wax (lubricant) | 0.3 | 0.3 | 0.3 | 0.3 |
| | | Ethylenediamine trianhydride (others) | 0.06 | 0.06 | 0.06 | 0.06 |
| | | Cu naphthenate (others) | 0.001 | 0.001 | 0.001 | 0.001 |
| | | Dimethyl-p-toluidine (accelerator) | 1 | 1 | 1 | 1 |
| | | Saccharin (accelerator) | 1 | 1 | 1 | 1 |

TABLE 1-continued

| Liquid type | Division | Material (unit: g) | Inventive Example 1 | Inventive Example 2 | Inventive Example 3 | Inventive Example 4 |
|---|---|---|---|---|---|---|
| Second liquid | Epoxy | Epoxy resin | 2.6 | 2.6 | 2.6 | 2.6 |
| | Additive | Polyether benzoate (oil) | 2.6 | 2.6 | 2.6 | 2.6 |
| | Initiator | Benzoyl peroxide | 2.6 | 2.6 | 2.6 | 2.6 |
| | Adhesive reinforcing agent | Poly(methacrylate-butadiene-styrene) | 2.1 | 2.1 | 2.1 | 2.1 |
| | | CRS/CRS Lap shear strength (MPa) | 28.6 | 22.8 | 19.4 | 24.9 |

TABLE 2

| Liquid type | Division | Material (unit: g) | Inventive Example 5 | Inventive Example 6 | Inventive Example 7 | Inventive Example 8 |
|---|---|---|---|---|---|---|
| First liquid | (Meth)acrylate-based monomer mixture | Methyl methacrylate | 48 | 48 | 48 | 46 |
| | | Urethane oligomer acrylate | 18 | 18 | 18 | 18 |
| | | 3-(trimethoxysilyl)propyl methacrylate | 2 | 2 | | |
| | | Allyl methacrylate | 2 | | | |
| | | Vinyl methacrylate | | 2 | 4 | 6 |
| | Adhesive reinforcing agent | Vinyl terminated butadiene rubber | 4.3 | 4.3 | 4.3 | 4.3 |
| | | Chlorosulphonated polyethylene | 3 | 3 | 3 | 3 |
| | | Poly(styrene-butadiene-styrene) | 2 | 2 | 2 | 2 |
| | | Poly(acrylonitrile-butadiene-styrene) | 15.5 | 15.5 | 15.5 | 15.5 |
| | Adhesion promoter | Methacrylated phosphate | 2 | 2 | 2 | 2 |
| | Inhibitor | Methylether hydroquinone (inhibitor) | 0.02 | 0.02 | 0.02 | 0.02 |
| | Antioxidant | 2,6-di-tert-butyl-p-cresol (antioxidant) | 0.12 | 0.12 | 0.12 | 0.12 |
| | Filler | Fumed silica | 3 | 3 | 3 | 3 |
| | Filler | Nano-titania | | | | |
| | | Carbon nanotubes | 0.05 | 0.05 | 0.05 | 0.05 |
| | Additive | Wax (lubricant) | 0.3 | 0.3 | 0.3 | 0.3 |
| | | Ethylenediamine trianhydride (others) | 0.06 | 0.06 | 0.06 | 0.06 |
| | | Cu naphthenate (others) | 0.001 | 0.001 | 0.001 | 0.001 |
| | | Dimethyl-p-toluidine (accelerator) | 1 | 1 | 1 | 1 |
| | | Saccharin (accelerator) | 1 | 1 | 1 | 1 |
| Second liquid | Epoxy | Epoxy resin | 2.6 | 2.6 | 2.6 | 2.6 |
| | Additive | Polyether benzoate (oil) | 2.6 | 2.6 | 2.6 | 2.6 |
| | Initiator | Benzoyl peroxide | 2.6 | 2.6 | 2.6 | 2.6 |
| | Adhesive reinforcing agent | Poly(methacrylate-butadiene-styrene) | 2.1 | 2.1 | 2.1 | 2.1 |
| | | CRS/CRS Lap shear strength (MPa) | 25.3 | 28.9 | 27.4 | 25.7 |

TABLE 3

| | | Inventive Example | | | |
|---|---|---|---|---|---|
| Lap shear strength (MPa) | | 1 | 4 | 5 | 6 | 7 |
| Material type | CRS/Aluminum | 20.5 | 17.1 | 19.5 | 21.2 | 20.2 |
| | CRS/CFRP | 13.7 | 11.7 | 12.8 | 14.4 | 13.3 |

As seen from Tables 1 to 3 above, a two-component adhesive composition according to inventive examples has a lap shear strength value equal to or equal to about 20 MPa and generally has excellent adherence.

Particularly, it may be clearly seen that Inventive Example 1 has a value of about 28.6 MPa and achieves excellent adherence of a cold rolled steel (CRS) plate which is a metal material compared with the prior art.

Such an excellent adherence may be considered to be caused by, as described above, using an acrylate monomer, oligomer, or the like of a specific component simultaneously, and formation of secondary cross-linking between an acrylate-based compound and other additives as well as an acrylate polymerization reaction of the monomer or oligomer.

Accordingly, the two-component adhesive composition according to the present invention may be variously used in industry fields in which a metal, a polymer resin material, or the like is used.

What is claimed is:

1. A two-component adhesive composition comprising:
    (i) a first part including a (meth)acrylate-based monomer mixture including components (a1) to (a3) below:
        (a1) an alkyl (meth)acrylate compound, and any one or more of
            (a121) a (meth)acrylate compound having an alkoxysilyl group, and
            (a122) a (meth)acrylate compound having an unsaturated functional group except for an acryloyl group,
        (a2) 50 to 100 parts by weight of an adhesive reinforcing agent relative to the 100 parts by weight of the (meth)acrylate-based monomer mixture, and (a3) 1 to 10 parts by weight of a filler relative to the 100 parts by weight of the (meth)acrylate-based monomer mixture;

(ii) a second part including components (b1) and (b2) below:

(b1) 100 parts by weight of an epoxy resin, and (b2) 50 to 150 parts by weight of an initiator with respect to (b1), wherein (i) the first part and (ii) the second part are mixed in a weight ratio of 1:1 to 20:1.

2. The two-component adhesive composition of claim 1, wherein
the (meth)acrylate-based monomer mixture further includes a urethane acrylate oligomer.

3. The two-component adhesive composition of claim 1, wherein
the alkyl (meth)acrylate is selected from the group consisting of methylmethacrylate, ethyl (meth)acrylate, n-propyl (meth)acrylate, isopropyl(meth)acrylate, n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

4. The two-component adhesive composition of claim 1, wherein (a121) the (meth)acrylate compound having the alkoxysilyl group includes one or more of mono, di, or tri methoxysilylmethyl (meth)acrylate, mono, di, or tri methoxysilylethyl (meth)acrylate, or mono, di, or tri methoxysilylpropyl (meth)acrylate.

5. The two-component adhesive composition of claim 1, wherein
(a122) the (meth)acrylate compound having the unsaturated functional group except for the acryloyl group includes one or more of allyl (meth)acrylate, vinyl (meth)acrylate, propenyl (meth)acrylate, or butenyl (meth)acrylate.

6. The two-component adhesive composition of claim 1, wherein
(a122) the (meth)acrylate compound having the unsaturated functional group except for the acryloyl group is included in an amount of from 1 to 10 wt % based on a total weight of (a1) the (meth)acrylate-based monomer mixture.

7. The two-component adhesive composition of claim 1, wherein
the adhesive reinforcing agent includes one or more of vinyl terminated butadiene rubber, chlorinated butadiene rubber, chlorosulfonated butadiene rubber, nitrile butadiene rubber (NBR), styrene butadiene rubber (SBR), silicon rubber, a styrene-butadiene-polymethylmethacrylate triblock copolymer, an acrylonitrile-butadiene-styrene copolymer, or a styrene-butadiene styrene copolymer.

8. The two-component adhesive composition of claim 1, wherein
the filler includes any one or a mixture of two or more of silica, fumed silica, or nanoclay.

9. The two-component adhesive composition of claim 1, wherein
the second part further includes carbon nanotubes with an aspect ratio of $1\times10^2$ to $1\times10^5$.

10. The two-component adhesive composition of claim 1, wherein
the epoxy resin is selected from the group consisting of cycloaliphatic epoxide, epoxy novolac resin, bisphenol-A epoxy resin, bisphenol-F epoxy resin, a bisphenol-A epichlorohydrin-based epoxy resin, alkyl epoxide, a dicyclopentadiene phenol additional reaction type of epoxy resin, limonene dioxide, and polyepoxide.

11. The two-component adhesive composition of claim 1, wherein
the initiator includes one or more of hydrogen peroxide, alkyl peroxide, alkyl hydroperoxide, aryl alkylperoxide, or peroxy ester.

12. The two-component adhesive composition of claim 1, further comprising
one or more additives of an adhesion promoter, an inhibitor, an accelerator, an antioxidant, a lubricant, an initiator, an oil, a curing agent, or a hardening accelerator.

* * * * *